United States Patent
Daoud et al.

(10) Patent No.: US 6,610,411 B2
(45) Date of Patent: Aug. 26, 2003

(54) SILICONE GEL TAPE FOR COAX CONNECTOR CONNECTION

(75) Inventors: Bassel H. Daoud, Parsippany, NJ (US); Christopher R. Gayle, San Jose, CA (US); Ivan Pawlenko, Holland, PA (US); Michael J. Wheeler, Haverhill, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/965,043

(22) Filed: Sep. 27, 2001

(65) Prior Publication Data

US 2003/0059626 A1 Mar. 27, 2003

(51) Int. Cl.[7] ................................................ B32B 9/04
(52) U.S. Cl. ......................... 428/447; 428/448; 156/53; 174/137 A; 174/137 B
(58) Field of Search ................ 428/447, 35.7; 174/137 A, 137 B; 156/53

(56) References Cited

U.S. PATENT DOCUMENTS 4,125,739 A * 11/1978 Bow ............................ 174/36
5,520,974 A * 5/1996 Chiotis et al. .............. 428/35.7

* cited by examiner

Primary Examiner—Robert Dawson
Assistant Examiner—Christopher M. Keehan
(74) Attorney, Agent, or Firm—Matthew J. Hodulik

(57) ABSTRACT

A protective tape used to protect an electrical connection from the effects of ultraviolet radiation. The protective tape comprises a silicone gel that contains a UV inhibitor such as zinc oxide. The protective tape is used to wrap a connection, such as a coaxial connection, in order to provide a long lasting, secure environment for the connection and to shield against the effects of UV radiation that can otherwise cause a deterioration of tape. As one embodiment, the silicone gel is a two layer gel with each layer having a different hardness. The tape is formed by casting the silicone gel on a suitable backing and that backing is removed from the tape at the time the tape is used to wrap around the electrical connection.

15 Claims, 1 Drawing Sheet

SILICONE GEL TAPE FOR COAX CONNECTOR CONNECTION

BACKGROUND OF THE INVENTION

The present invention relates to a protective wrapping for a wire connection, and more particularly, to a tape containing an ultraviolet (UV) inhibitor to protect the integrity of the tape from the adverse effects of sunlight.

Certainly, there are many electrical connections that are made and which are located in an area subject to the adverse effects of sunlight. As typical examples, there are many of such connections used in the field of wireless and other technologies utilized in transmitting voice and data communications. In such fields, the normal connection made between an antenna and other is often designed to use a coaxial or coax cable and a coax connector.

Thus, with a normal interconnection between a coax cable and a coax connector, the coax cable is threadedly affixed to the connector to carry out that connection and, of course, to maintain the components together. Since the connection itself is not a water resistant or even atmospherically resistant, there is a need to provide some environmental protection to protect that connection from being deteriorated by the elements. In many cases, a tape is used to wrap around the completed connection to afford that needed protection. In general, the tape used is a electrical tape with an additional sealant material such as a Teflon tape.

While such a coax connection protected by electrical tape may be acceptable for some time, after a few months the tape is degraded by the effects of ultraviolet that acts upon the tape and eventually, moisture will get into the connection and as a consequence, the quality of the signal will deteriorate.

Accordingly, it would be advantageous to have a tape that could be used to wrap around a coax connection, or for that matter, any electrical connection, and not deteriorate from the detrimental effects of the UV radiation.

SUMMARY OF THE INVENTION

In accordance with the present invention, therefore, there is provided a tape that is adapted to withstand the harsh environmental conditions, particularly the harmful effects of UV radiation and yet which is easy to apply to a connection, such as a coax connection, in a similar manner as the current convention tape.

Thus, in accordance with the present invention, the a tape is made by casting silicone material containing a UV inhibitor so that the ultimate tape is resistant to the harmful effects of the UV radiation, however, the UV resistant tape can still be formed so as to be flexible as well as adherent to the coaxial connection. In the casting of the tape, the UV resistant material can be cast on a special paper, foil or any other carrier that would allow the tape to be easily peeled from that backing.

In the preferred embodiment, the thickness of the silicone containing the UV resistant material can be from about 0.030 inches to about 0.090 inches and can be formed as strips or provided n a coiled form as a roll to be unrolled on site. The silicone may have a hardness 30 durometer but will vary depending upon the particular application.

As a alternative embodiment the UV resistant tape may comprise multiple layers of silicone material, for example, a two layer tape of silicone materials formed together with each layer having a differing hardness, for example, one of the materials having layer with a hardness of 20 durometer and second layer with a hardness of 40 durometer forming a composite layered tape by casting one layer after the other on to the backing. The advantage of the alternate, multilayer embodiment would be that the softer material would have a tendency to penetrate more easily and is tackier, while the harder material would permit the easier handling of the tape.

With either embodiment, the use of the UV resistant tape is similar to the use of conventional tape, that is, once the connection, such as a coaxial connection has been made, the tape made in accordance with the present invention is wrapped around the connection until all of the metal surfaces have been covered. Thus, the connection is protected from the harmful environmental conditions that could deteriorate the connection, even as to the effect of the UV radiation upon the tape. Since the material is UV resistant, the tape will last longer than the current protective electrical tapes and, in addition, the silicone material will provide excellent protection in areas where the salt content of the air is high, such as sea shore areas.

Other features of the present UV resistant tape and its use will become apparent in light of the following detailed description of a preferred embodiment thereof and as illustrated in the accompanying drawings.

DETAILED DESCRIPTION OF THE INVENTION

Figure 1:
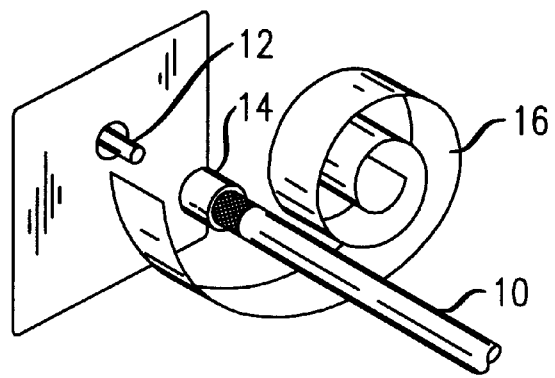
FIG. 1 is a perspective view of a typical coaxial connection that is being wrapped with a tape for protection.

Referring now to FIG. 1, there is shown a perspective view of a typical connection made between a coaxial cable 10 and a coaxial connector 12. As can be seen, the coaxial connector 12, as is normal, extends outwardly for a piece of equipment and is normally used to affix that equipment to an antenna for the transmission of voice or data communication. The outwardly extending coaxial connector 12 has external threads to form a male connection. The coaxial cable 10 itself has internal threaded within a rotatable end 14 and which is, in carrying out the connection, threadedly engaged with the external threads of the coaxial connector 12 to make the electrical connection.

Also shown in FIG. 1 is a roll of tape 16 that is in position to be wrapped around the connection between the coaxial connector 12 and the coaxial cable 10 when that connection has been completed as previously described and which is intended to protect that connection from the external environment.

Figure 2:
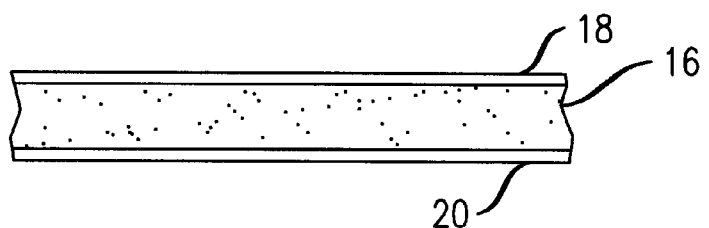
FIG. 2 is a side cross sectional view of a UV resistant tape made in accordance with the present invention.

Turning now to FIG. 2, there is shown a side cross sectional view of a UV resistant tape 16 made in accordance with the present invention. In FIG. 2, there are backings 18, 20 on each side of the silicone tape 16 and which enclose the tape 16 and which enables the tape to be coiled or provided in strips and still be protected. The backings 18, 20 may be paper, foil or other easy material that can be easily and simply peeled off from the tape 16 when it is desired use the tape for wrapping an electrical connection.

In the preferred embodiment, the tape 16 can be formed of a flame retardant gel, and one is commercially available from Gel Sciences, Inc. of Hayward, Calif. under the designation SG-10039 and is a nonflammable silicone gel intended for general purpose potting and encapsulation. The gel has a UV resistant inhibitor of zinc oxide formulated therein, and its other properties include excellent sealing properties, excellent insulating properties, excellent adhesion to substrates, very low migration, good chemical resistance, constant properties over a wide range of temperatures and a very high elongation. Such properties make that gel particularly well suited to be cast onto a backing in order to make the UV resistant tape for the intended purpose set forth herein. A preferred hardness is about 30 durometer but that may vary depending on the particular application.

The actual silicon gel is basically polydimethylsiloxane and zinc oxide, the latter providing the UV resistance. Although the aforementioned gel is the preferred gel, other gels can be used having the same or similar properties, the important property being, of course, the ability to resist the effects of the UV radiation on the tape.

The casting process to form the tape itself is a conventional process that places the silicone gel containing the UV inhibitor onto a backing and that backing is, of course, removed from the tape by the user just prior to its use at the time the electrical connection is wrapped for protection.

Figure 3:
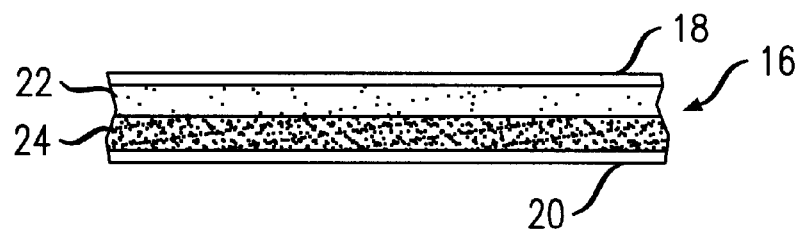
FIG. 3 is a side cross sectional view of an alternate embodiment of the UV resistant tape of FIG. 2

Turning now to FIG. 3, there is shown a side cross sectional view of an alternative embodiment of the present invention and where the silicone tape 16 includes the backings 18, 20 but where silicone tape 16 is comprised of multiple layers of the gel material. As can be seen, there is an outer layer 22 and an inner layer 24, the convention being that the inner layer 24 is the layer that contacts the electrical connection and the outer layer forms the exterior of the tape 16 when wrapped around that electrical connection. In the preferred embodiment, there are two of such layers and each has a different hardness, that is, the inner layer 24 may have a lesser hardness than the outer layer 22. For example, the inner layer 24 may have a hardness of about 20 durometer while the outer layer may have a hardness about 40 durometer. By use of the multiple layers having different hardnesses, the inner layer 24 can be placed against the electrical connection and its relative softness will allow it to better adhere and cover the connection while the harder outer layer 22 allows the tape 16 to have a strength to maintain the integrity of the tape 16 when it is applied to the electrical connection.

It will be understood that the scope of the invention is not limited to the particular embodiment disclosed herein, by way of example, but only by the scope of the appended claims.

We claim:

1. A protective tape adapted to be used in the wrapping of electrical connections subject to UV radiation, said tape comprising a silicone gel containing a UV inhibitor, wherein said silicone gel comprises multiple layers of silicone gels and at least two of said multiple layers have differing densities.

2. A protective tape as defined in claim 1 wherein said UV inhibitor is zinc oxide.

3. A protective tape as defined in claim 1 wherein said tape includes at least one backing.

4. A protective tape as defined in claim 3 wherein said tape has a backing on each surface thereof.

5. A protective tape as defined in claim 3 wherein said silicone gel is cast onto said at least one backing.

6. The protective tape as defined in claim 1 wherein said multiple layers comprise two layers.

7. A method of protecting an electrical connection, said method comprising the steps of:

providing a tape comprising a silicone gel containing a UV inhibitor, wherein said silicone gel comprises multiple layers of silicone gels and at least two of said multiple layers have differing densities;

wrapping the tape around the electrical connection to protect the electrical connection from UV radiation in the environment.

8. A method of protecting an electrical connection as defined in claim 7 wherein the electrical connection is a coaxial cable connected to a coaxial connector.

9. A method of protecting an electrical connection as defined in claim 7 wherein said step of providing a silicone tape comprises providing a silicon tape having zinc oxide as the UV inhibitor.

10. A protected electrical connection joining at least two electrical conductors, said electrical connection having said at least two electrical conductors enwrapped with a protective tape comprising a silicone gel containing a UV inhibitor, wherein the silicone gel comprises multiple layers of a silicone gel having a UV inhibitor and wherein the hardness of at least two of the multiple layers is different.

11. A protected electrical connection as defined in claim 10 wherein there are two electrical conductors and wherein one of said conductors is a coaxial connector and said other conductors is a coaxial cable.

12. A protected electrical connection as defined in claim 10 wherein said UV inhibitor is zinc oxide.

13. A protected electrical connection as defined in claim 12 wherein said silicone gel is comprised of polydimethylsiloxane containing zinc oxide.

14. A protected electrical connection as defined in claim 10 wherein the layer having a lesser hardness contacts the electrical conductors.

15. A protected electrical connection as defined in claim 10 wherein said multiple layers comprise an inner layer and outer layer, and wherein said inner layer has a hardness of about 20 durometer and said outer layer has a hardness of about 40 durometer.

* * * * *